(12) United States Patent
Meece et al.

(10) Patent No.: US 6,547,495 B2
(45) Date of Patent: Apr. 15, 2003

(54) METHOD FOR REAMING HOLE AND IMPROVED REAMER

(75) Inventors: Roy Dean Meece, New Trenton, IN (US); Gerald Roger Geverdt, Cincinnati, OH (US); James Allen Baird, Jr., Amelia, OH (US)

(73) Assignee: General Electric Company, Schenectady, NY (US)

( * ) Notice: Subject to any disclaimer, the term of this patent is extended or adjusted under 35 U.S.C. 154(b) by 118 days.

(21) Appl. No.: 09/772,334

(22) Filed: Jan. 29, 2001

(65) Prior Publication Data

US 2002/0102141 A1 Aug. 1, 2002

(51) Int. Cl.$^7$ ............................ B23B 35/00; B23B 51/02
(52) U.S. Cl. ................. 408/1 R; 408/227; 408/230; 408/705
(58) Field of Search .................... 408/1 R, 224, 408/227, 229, 230, 199, 59, 705, 57, 223; 82/1.11, 46, 47

(56) References Cited

U.S. PATENT DOCUMENTS

| | | | | |
|---|---|---|---|---|
| 3,216,107 A | * | 11/1965 | Andreasson | 407/1 |
| 3,307,243 A | * | 3/1967 | Andreasson | 407/11 |
| 3,591,302 A | * | 7/1971 | Andreasson | 408/224 |
| 4,032,250 A | * | 6/1977 | Lavallee | 408/229 |
| 4,231,693 A | | 11/1980 | Kammeraad | 408/230 |
| 5,180,260 A | | 1/1993 | Phillips | 403/211 |
| 5,478,179 A | | 12/1995 | Kress et al. | 408/199 |
| 5,775,853 A | | 7/1998 | Keefer et al. | 408/1 R |
| 5,921,728 A | | 7/1999 | Kammeraad et al. | 408/227 |

FOREIGN PATENT DOCUMENTS

JP          306121 A    * 12/1989

OTHER PUBLICATIONS

Tool and Manufacturing Engineers Handbook, Fourth Edition, vol. 1, Machining, Society of Manufacturing Engineers, 1983, pp. 9–111 to 9–117 and 9–127 to 9–129.*
Tonshoff et al., "Took and Process Design for High–Efficient Machining," Soc. Mfg. Eng. (1999), pp. MR99–255–1 to MR99–255–14.

* cited by examiner

Primary Examiner—Daniel W. Howell
(74) Attorney, Agent, or Firm—V. G. Ramasamy; Hasse Guttag & Nesbitt LLC; Eric W. Guttag

(57) ABSTRACT

A method for reaming a hole in a metal substrate that minimizes the tendency of long and stringy metal chips to be formed that can surround the reamer with a "steel wool-like" mesh or mass of material, as well as an improved reamer for carrying out this method. The reaming method involves longitudinally advancing the chamfered end of the reamer into the hole at an increased rate of at least about 5 mils (0.13 mm) per cutting edge as the hole is reamed during rotation of the reamer. For holes or bores having a length (L) that is at least about 3 times the cutting diameter (D) of the reamer, a preferred subsequent step is to momentarily reduce the rate of advance of the chamfered end into the hole to about 1 mil (0.025 mm) or less per cutting edge for from about 1 to about 5 rotations of the reamer. The improved reamer has a body, at least three flutes formed in the body, each flute terminating at a chamfered leading end and having a chamfer face proximate the chamfered end, the chamfer face having a chamfer angle of from about 20 to about 30° and having a leading edge of the margin that trails the rake face of the flute, i.e., a negative radial rake angle.

18 Claims, 3 Drawing Sheets

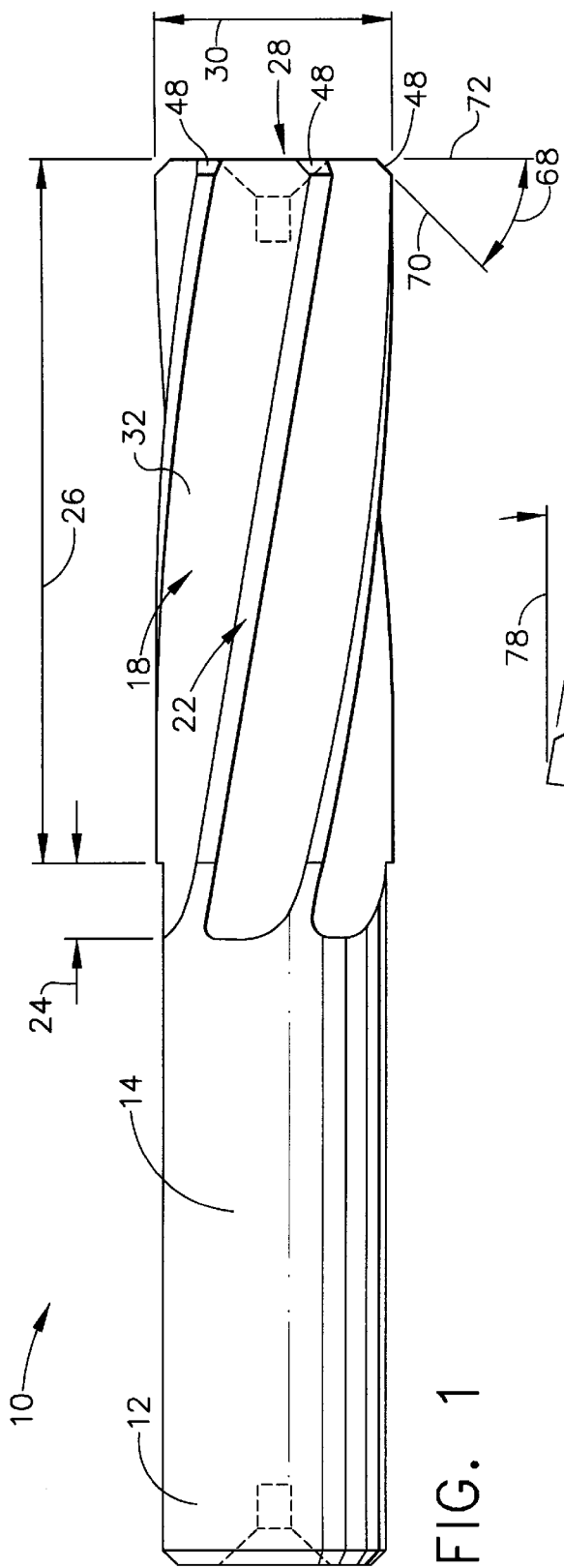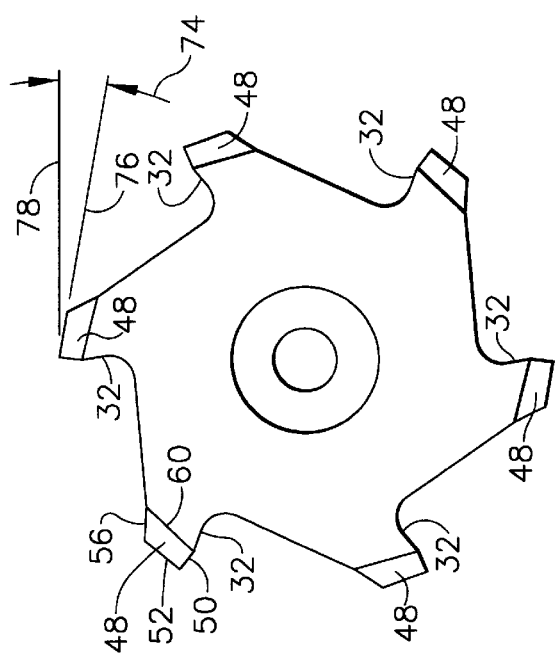

METHOD FOR REAMING HOLE AND IMPROVED REAMER

BACKGROUND OF THE INVENTION

The present invention relates generally to a method for reaming a hole in a metal substrate as part of a finishing operation. The present invention further relates to an improved reamer for carrying out this method.

In a wide variety of drilling, repair or reconditioning processes for metal substrates, such as shafts, flanges, compressor disks and other turbine engine components, frames, casings and engine mounts, it is necessary to accurately or precisely cut or finish the hole that is formed to a predetermined diameter. For example, in many cases after a drilling operation involving a metal substrate, reaming of the hole is carried out to impart a finer finish thereto. See Tonshoff et al, "Tool and Process Design for High-Efficient Machining," Soc. Mfg Eng., (1999), MR99-255-9. A conventional reamer used in such reaming operations generally has a cylindrical body, a shank at one end of the body, typically four, six or eight helical or spiral grooves or flutes formed in the outer peripheral surface of the body and a chamfered leading end opposite the shank end where the flutes terminate. Each flute also has a chamfer face proximate its chamfered leading end. See U.S. Pat. No. 5,921,728 (Kammeraad et al), issued Jul. 13, 1999. See also U.S. Pat. No. 4,231,693 (Kammeraad), issued Nov. 4, 1980.

As the reamer rotates during a typical reaming operation, the leading cutting edge (sometimes referred to as a "cutting tooth") of each chamfer face axially cuts or scrapes the surface of the hole of the metal substrate. The metal cuttings or scrapings that are generated from the surface of the hole during this reaming operation are commonly referred to as "chips." These metal chips can be formed in various sizes, shapes and configurations and are deflected away from the cutting zone of the reamer by the chamfer face. The angle that the chamfer face makes, relative to plane at the chamfered end perpendicular to the rotational axis of the reamer, is typically about 45° for a standard reamer.

During the reaming operation, the reamer is typically advanced into the hole at a particular penetration feed or advance rate. This advance rate is typically measured in terms of the longitudinal distance (in mils or thousandths of inch or mm) the reamer advances or penetrates into the hole, per rotation or revolution of the reamer. Because reamers can have different numbers of flutes, and thus different numbers of cutting edges or teeth, a more uniform value for this advance or feed penetration rate is based on the distance the reamer advances or penetrates into the hole per cutting edge or tooth. This is usually determined by taking the advance or feed penetration rate per revolution and dividing it by the number of cutting edges or teeth on the reamer.

For standard reaming operations, the advance or feed penetration rate of the reamer (for example, a reamer having eight flutes, and therefore eight cutting edges or teeth) is typically about 8 mils (0.20 mm) per revolution or about 1 mil (0.025 mm) per cutting edge or tooth. At this standard advance or penetration rate, relatively long and stringy metal chips are typically formed. These long and stringy metal chips are not easily deflected away from the cutting zone, but instead tend to collect around the reamer and form a "steel wool-like" mesh or mass of material that surrounds the outer periphery of the reamer. This generation of the "steel wool-like" mesh or mass of material becomes even more acute as the length of the hole to be reamed becomes longer, especially relative the outer cutting diameter of the reamer.

The collection of this "steel wool-like" mesh or mass of material around the outer periphery of the reamer can create a number of problems. Frequently, fluid coolants need to flow or be fed to the cutting zone of the reamer to lower its temperature as heat is generated during the reaming operation. Indeed, it can be extremely important to have this coolant flow unimpeded to the cutting zone to avoid excessive wear or damage to the reamer. Unfortunately, as this "steel wool-like" mesh or mass of metal chips forms and surrounds the outer periphery of the reamer during a standard reaming operation, the flow of coolant to the cutting zone of the reamer can be greatly impeded. This can lead to undesired wear or damage to the reamer, as well as making accurate and precise finishing of the hole difficult to achieve.

Accordingly, it would be desirable, therefore, to provide a method for reaming a hole that does not generate this "steel wool-like" mesh or mass of metal chips that can surround the outer periphery of the reamer and thus impede the flow of coolant to the cutting zone, especially when the length of the hole is relatively long relative to the outer cutting diameter of reamer. It would further be desirable to provide an improved reamer that minimizes the undesired generation of this "steel wool-like" mesh or mass of metal chips when carrying out this reaming operation.

SUMMARY OF THE INVENTION

The present invention relates to a method for reaming a hole in a metal substrate with a reamer that includes a body having a rotational axis, at least three flutes formed in the body, each flute terminating at a chamfered leading end and having a chamfer face proximate the chamfered end, the chamfer face having a leading cutting edge. This method comprises longitudinally advancing the chamfered end of the reamer into the hole at the rate of at least about 5 mils (0.13 mm) per cutting edge as the hole is reamed during rotation of the reamer. For holes having a length (L) that is at least about 3 times the cutting diameter (D) of the reamer, a preferred subsequent step is to reduce the rate of advance of the chamfered end of the reamer into the hole to about 1 mil (0.025 mm) or less per cutting edge for at least about 1 revolution or rotation of the reamer.

The present invention further relates to an improved reamer for carrying out this reaming method. This improved reamer comprises:
(a) a body having a rotational axis;
(b) at least three flutes formed in the body;
(c) each flute terminating at a chamfered leading end and having a chamfer face proximate the chamfered end;
(d) the chamfer face having a leading cutting edge and a chamfer angle of from about 10 to about 300;
(e) each flute having a negative radial rake angle.

The reaming method, as well as the improved reamer, of the present invention, provides a number of significant advantages and benefits over standard reaming methods and reamers. By increasing the rate of advance or feed penetration of the reamer during the reaming operation, the tendency during reaming to create long and stringy metal chips that result in a "steel wool-like" mesh or mass of material that can surround the outer periphery of the reamer is either minimized or avoided. As a result, coolant flow to the cutting zone is impeded less or not at all, thus avoiding excessive wear and damage to the reamer. By avoiding excessive wear and damage to the reamer, more holes can be finished in less time by minimizing the number of times the reamer needs to be changed. The preferred subsequent step of momentarily reducing the rate of advance of the chamfered end for holes having higher L/D ratios relative to the outer cutting diameter of the reamer increases the likelihood that the metal chips will break off before they become excessively long, again avoiding the formation of the "steel wool-like" mesh or mass of material around the outer periphery of the reamer. The improved reamer where each flute has a chamfer face with a decreased or "shallower" chamfer angle provides an improved pathway for easier and quicker removal of chips from the cutting zone of the reamer, especially when used in reaming operations involving long or deep holes. An optional but preferred aspect of this improved reamer is to provide a rounded or "honed" cutting edge for the chamfer face. Rounding or "honing" of the cutting edge improves its strength to resist chipping, as well as polishing the grind line to improve the finish or edge of the improved reamer.

BRIEF DESCRIPTION OF THE DRAWINGS

FIG. 1 is a side view of an exemplary embodiment of the reamer used in the present invention.

FIG. 2 is the chamfered leading end of the reamer of FIG. 1.

DETAILED DESCRIPTION OF THE INVENTION

Figure 3:
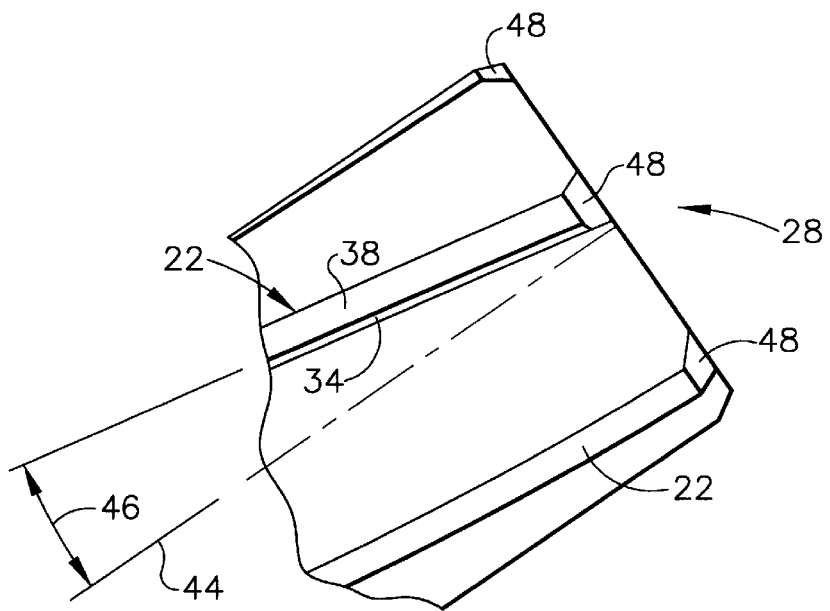
FIG. 3 is an enlarged view of a portion of the reamer of FIG. 1 showing the chamfered end in more detail.

Referring to the drawings, FIG. 1 illustrates an exemplary embodiment of the reamer of the present invention referred to generally as 10. Reamer 10 usually includes a shank 12 typically having a cylindrical cross section at one end thereof (the shank end of the reamer) that is gripped by a rotating device to rotate reamer 10 during the reaming operation. Reamer 10 has a cylindrical body indicated by 14 that has formed therein flutes 18 to permit the removal of chips of material that are scraped or cut out of the hole in the metal substrate during the reaming operation. Reamer 10 has at least three flutes 18, and typically has an even number of such flutes, for example four, six, eight or ten flutes in the form of spiral or helical grooves in body 14. For example, the exemplary embodiment of reamer 10 shown in the drawings has six such flutes 18 that are grooved into body 14 to form a sextuple helix.

Body 14 includes what is conventionally known as a land 22 which is the portion of the reamer body between adjacent flutes 18. As shown in FIG. 1, flute 18 and land 22 extend generally from flute sweep 24 at the shank end 12 of reamer 10 towards the other end of the reamer (the "chamfered leading end") which is indicated by 28 where reamer 10 terminates. (The length of the flute sweep 24 should be such as to allow efficient chip evacuation.) The length of the flute as indicated as 26 can vary and is usually dependent on the length of the hole to be reamed. Usually, flute length 26 is greater than the length of the hole to be reamed, and preferably is greater than the length of the hole to be reamed by at least the diameter of the hole.

As shown in FIG. 1, the outer cutting diameter 30 of reamer 10 is defined by the diameter at the chamfered end 28 of reamer 10. The cutting diameter 30 of reamer 10 can vary and is typically a function of the diameter of the hole to be finished during the reaming operation. Reamers useful in the present invention usually have cutting diameters in the range of from about 125 to about 1000 mils (from about 3.2 to about 25.4 mm), and more typically in the range of from about 185 to about 750 mils (from about 4.7 to about 19.1 mm). The particular cutting diameter of the reamer is generally determined by the size or diameter of the hole to be reamed.

The wall of flute 18 has a rake face 32 that extends from flute sweep 24 and terminates at the chamfered end 28 of reamer 10. As particularly shown in FIGS. 3, 4 and 5, land 22 includes a margin 34 having a leading edge 36 that is also the outer peripheral edge of rake face 32, and a clearance 38 having a trailing edge 40. Margin 34 and clearance 38 extend the entire length of land 22. Margin 34 and clearance 38 also intersect at an edge 42 that can be referred to as either the trailing edge of margin 34 or the leading edge of clearance 38. As shown in FIG. 3, the angle formed by the intersection of the line defined by edge 36 and the plane extending radially from the rotational axis 44 of reamer 10 is referred to as the helix angle for each flute and is indicated as 46. If helix angle 46 is too great or steep, the cutting edge of the reamer can be undesirably weakened. Conversely, if helix angle 46 is too low or too shallow, this can undesirably increase the cutting forces or torque on the reamer such that there is excessive resistance imparted to the reamer as it rotates during use. This helix angle is usually in the range of from 5 to about 30°, more typically from about 8 to about 15°. Within these ranges, the helix angle can be selected to allow adequate chip evacuation so that coolant delivery is not impeded.

Figure 6:
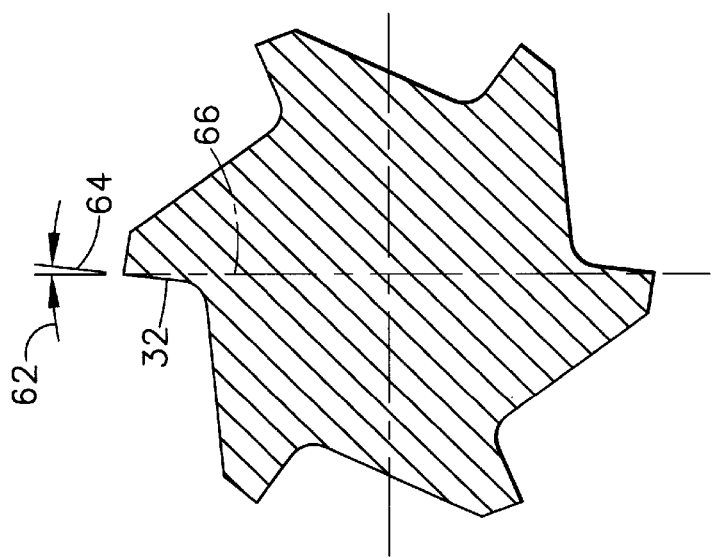
FIG. 6 is a sectional view along line 6—6 of FIG. 5.

As best illustrated in FIGS. 2, 3, 4 and 5, each flute 18 has a chamfer face 48 proximate the chamfered end 30 of reamer 10. Each chamfer face 48 has a leading cutting edge 50, an outer peripheral edge 52, a trailing edge 56 and an inner edge 60. As shown particularly in FIG. 6, each flute 18 has a radial rake angle 62. The radial rake angle 62 is defined by the line 64 tangent to rake face 32 and the line 66 perpendicular to rotational axis 44 as they intersect at the leading edge 36 of margin 34. As also shown particularly in FIG. 6, this radial rake angle is "negative," i.e., leading edge 36 of margin 34 trails the rake face 32. It has been found that a positive radial rake angle 62 (i.e., where edge 36 of margin 34 leads rake face 32) can cause excessive breaking or chipping of cutting edge 50 of the reamer. Accordingly, it is preferred that reamers used in the present invention have a negative radial rake angle 62 to prevent or minimize the chipping or breaking of the cutting edge 50. This negative radial rake angle is usually in the range of from −1 to about −20°, more typically from about −5 to about −10°.

As particularly shown in FIG. 1, chamfer face 48 has a chamfer angle indicated as 68 that is defined by the intersection of the plane 70 formed by face 48 and the plane 72 at chamfered end 28 perpendicular to rotational axis 44. For reamers useful in the present invention, chamfer angle 68 can be in the range of from about 0 to about 70°, and more typically in the range of from about 10 to about 45°. For improved reamers of the present invention, this chamfer angle 68 is shallower and in the range of from about 5 to about 35°, preferably from about 20 to about 30°. This shallower chamfer angle has been found to provide an improved pathway for easier and quicker removal of chips from the cutting zone of the reamer, especially when used in reaming operations of the present invention involving long or deep holes.

As shown in FIG. 2, each land 22 has a radial clearance angle indicated as 74. Radial clearance angle 74 is defined by the line 76 that passes through outer peripheral edge 52 and the line 78 tangent to margin 34 at the leading edge 36 as they intersect at trailing edge 42. The radial clearance angle 74 thins margin 34 to reduce friction and rubbing of the reamer. For reamers useful in the present invention, radial clearance angle 74 is usually in the range of from about 15 to about 30°, and preferably from about 18 to about 22°.

Figure 4:
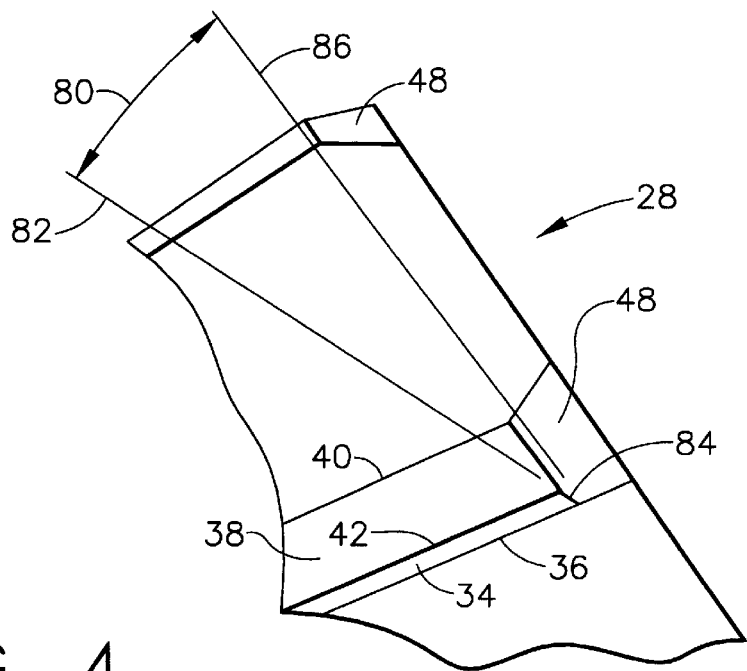
FIG. 4 is an enlarged view of a portion of the reamer shown in FIG. 3.
Figure 5:
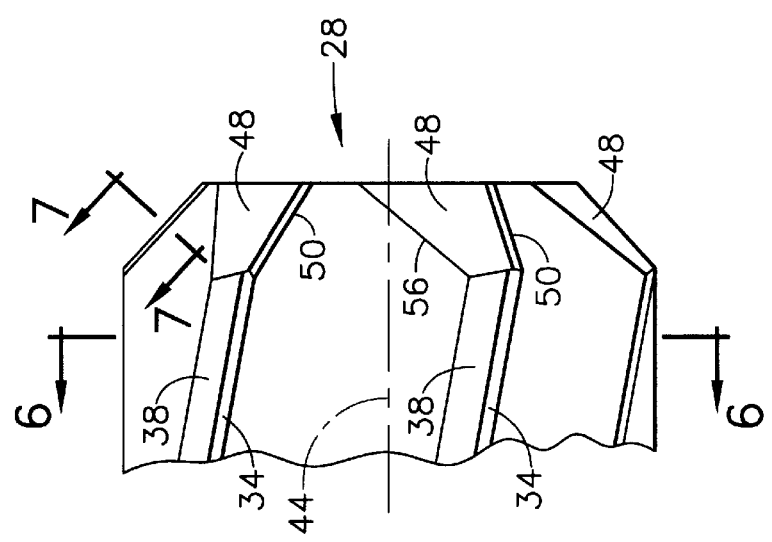
FIG. 5 is an enlarged partial side view of the reamer shown in FIG. 1

As shown in FIG. 4, each chamfer face 48 has a chamfer relief angle indicated as 80. Chamfer relief angle 80 is defined by the intersection of the line 82 passing through the terminating edge 84 of margin 34 proximate the chamfered end 28 and the plane 86 perpendicular to rotational axis 44. The chamfer relief angle allows penetration of chamfered end 28 into the hole to be reamed. For reamers useful in the present invention, the chamfer relief angle 80 is usually in the range of from about 2 to about 30°, and preferably from about 8 to about 15°.

Figure 7:
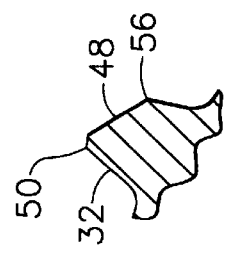
FIG. 7 is a partial sectional view along line 7—7 of FIG. 5 showing the preferred rounded or "honed" cutting edge of the improved reamer of the present invention.

As shown in FIG. 7, reamers useful in the present invention preferably have a rounded or "honed" cutting edge 50. Rounding or "honing" of cutting edge 50 improves its strength to resist chipping, as well as polishing the grind line to improve the finish or edge of the improved reamer. The rounded or "honed" edge 50, can be formed by a variety of methods, including abrading edge 50 with a silicon carbide impregnated brush, an abrasive slurry, a diamond file or any other suitable manner know to the art. It is also preferred to grind chamfer face 48 parallel to cutting edge 50. This will improve the strength of the chamfer face 48 to also resist chipping.

In the method of the present invention for reaming the hole, the chamfered end 28 of reamer 10 is inserted into a hole or similar bore that has already been formed or drilled in the metal substrate (e.g., a flange). The particular rotational speed or rate of revolution of the reamer can vary depending upon the metal substrate involved, in particular the material that the metal substrate is made of, the type of reaming operation involved and like factors. For example, faster rotational speeds increase wear, while slower rotational speeds increase the amount of time to ream the hole. For reaming operations involving the method of the present invention, the rotational speed of the reamer is usually in the range of from about 10 to about 100 surface feet per minute (sfm) (from about 3.05 to about 30.5 m/min.), and preferably in the range of from about 20 to about 45 sfm (from about 6.1 to about 13. m/min.).

A key aspect of the method of the present invention is the advance or feed penetration rate of chamfered end 28 of the reamer into the hole to be reamed. As used herein, the terms "advance rate" and "feed penetration rate" are used interchangeably to refer to the longitudinally advance of the chamfered end 28 of the reamer into the hole being reamed as the reamer is being rotated within the hole. It has particularly been found that increasing the advance or feed rate of the chamfered end 28 of the reamer into the hole during the rotation of the reamer is extremely important in minimizing or completely avoiding the tendency during reaming to create long and stringy metal chips that result in a "steel wool-like" mesh or mass of material that can surround the outer periphery of the reamer. Instead, the chip length is decreased and chip thickness is increased, making the chip easier to manage (e.g., by breaking or deflecting chip).

In the method of the present invention, the chamfered end of the reamer is longitudinally advanced at the rate of at least about 5 mils (preferably at least about 6 mils) per cutting edge as the hole is reamed during rotation of the reamer. Usually, the chamfered end of the reamer is advanced at a rate in the range of from about 5 to about 10 mils (from about 0.13 to about 0.25 mm) per cutting edge as the hole is reamed, and preferably at a rate in the range of from about 6 to about 8 mils (from about 0.15 to about 0.2 mm).

It has also been found that as the length of the hole increases relative to the outer cutting diameter 30 of the reamer, this can also affect the length of the metal chips that are formed during the reaming operation. In particular, as the ratio of the length (L) of the hole relative to the outer cutting diameter (D) of the reamer increases above about 3, the metal chips tend to become excessively long at the increased advance or feed penetration rates used in the method of the present invention. This can lead to the undesired formation of a tangled mass of material around the outer periphery of the reamer, thus obstructing coolant flow.

For holes having these higher L/D ratios (i.e., about 3 or greater) relative to the outer cutting diameter 28 of the reamer, it has been found to be important to momentarily reduce the advance or feed penetration rate of the chamfered end 28 into the hole. By reducing the rate of advance or penetration of the chamfered end 28 of the reamer momentarily, it has been found that this increases the likelihood that the metal chips will be easier to manage (e.g., break off) before they become excessively long. This will again minimize or prevent the formation of the tangled mass of material around the outer periphery of the reamer. After reducing the rate of advance or penetration of the chamfered end 28 of the reamer momentarily, the rate of advance or penetration can then be increased to the higher rate of the initial step to complete the reaming of the hole.

For holes having higher L/D ratios of about 3 or greater relative to the outer cutting diameter 30 of the reamer, the preferred subsequent step of the method of the present invention (i.e., after the initial increased advance or feed penetration rate step) involves reducing the advance or feed penetration rate of the chamfered end 28 of the reamer into the hole to about 1 mil (0.025 mm) or less, typically about 0.5 mils (0.12 mm) or less, per cutting edge or tooth for from about 1 to about 5 revolutions or rotations of the reamer. Usually, the advance or feed penetration rate during this subsequent step is reduced to from about 0.1 to about 1 mils (from about 0.0025 to about 0.025 mm), preferably from about 0.2 to about 0.5 mils (from about 0.005 to about 0.013 mm), per cutting edge or tooth for from about 1 to about 5 revolutions or rotations of the reamer, and preferably for from about 1 to about 2 revolutions or rotations of the reamer. After this momentary reduction in the advance or feed penetration rate, the rate of advance of the chamfered end 28 into the hole can then be increased to at least about 5 mils (0.13 mm) per cutting edge or tooth to complete the reaming of the hole.

For holes having higher L/D ratios of about 4 or greater relative to the outer cutting diameter 30 of the reamer, it can be desirable to momentarily reduce the advance or feed penetration rate more than one time. For example, in one embodiment of this alternative method for L/D ratios of from about 4 to about 6, it is preferred to momentarily reduce the advance or penetration rate at least twice during the reaming operation, i.e., after increasing the advance or feed penetration rate the second time, momentarily reducing the advance or feed penetration rate a second time to allow the metal chips to bend or break off, followed by increasing the advance or feed penetration rate again to at least about 5 mils (0.13 mm) per cutting edge or tooth. Typically, for L/D ratios of from about 3 to about 6, the advance or feed penetration rate is momentarily reduced 1 to 4 times (i.e., is repeated 1 to 4 times), with the rate of advance being increased to the higher rate (i.e., at least about 5 mils (0.13 mm) per cutting edge) after each momentary reduction in advance rate. Usually, the interval between each momentary reduction in advance rate is equal to when the chamfered end of the reamer has advanced in the hole a distance of from about 100 to about 500 mils (from about 2.5 about 12.7 mm), typically from about 200 to about 300 mils (from about 5.1 about 7.6 mm). For example, for a reamer having a cutting diameter of 250 mils (6.4 mm.) used to ream a hole having a length of 1250 mils (31.8 mm), the advance or feed penetration rate of the reamer is momentarily reduced to 0.5 mils (0.013 mm) for about 1 revolution after the chamfered end 28 of the reamer advances each 250 mils (6.4 mm) through the hole, i.e., as the chamfered end of the reamer advances to 250, 500, 750 and 1000 mils (6.4, 12.7, 19.1 and 25.4 mm) through the hole, the advance rate then being increased to at least about 5 mils (0.1 mm) per cutting edge after each momentary reduction.

While specific embodiments of the present invention have been described, it will be apparent to those skilled in the art that various modifications thereto can be made without departing from the spirit and scope of the present invention as defined in the appended claims.

What is claimed is:

1. A method for reaming a hole in a metal substrate with a reamer that includes a body having a rotational axis, at least three flutes formed in the body, each flute terminating at a chamfered leading end and having a chamfer face proximate the chamfered end, the chamfer face having a leading cutting edge, the method comprising the step of: (a) longitudinally advancing the chamfered end of the reamer into the hole at the rate of at least about 6 mils per cutting edge as the hole is reamed during rotation of the reamer, the reamer having a rotational speed of from about 10 to about 100 sfm.

2. The method of claim 1, wherein the chamfer face of the reamer of step (a) has a chamfer angle of from about 10 to about 45° and wherein each flute in the body of the reamer of step (a) has a rake face, a helix angle in the range of from 5 to about 30°, and a negative radial rake angle.

3. The method of claim 2 wherein the negative radial rake angle of each flute of the body of the reamer of step (a) is in the range of from −1 to about −20°.

4. A method for reaming a hole in a metal substrate with a reamer that includes a body having a rotational axis, at least three flutes formed in the body, each flute terminating at a chamfered leading end and having a chamfer face proximate the chamfered end, the chamfer face having a leading cutting edge, the method comprising the steps of:

(a) longitudinally advancing the chamfered end of the reamer into the hole at the rate of at least about 5 mils per cutting edge as the hole is reamed during rotation of the reamer, the hole being reamed having a length (L) that is at least about 3 times the cutting diameter (D) of the reamer; and (b) reducing the rate of advance of the chamfered end of the reamer into the hole to about 1 mil or less per cutting edge for at least about 1 rotation of the reamer.

5. The method of claim 1 wherein the chamfered end of the reamer is advancing during step (a) at a rate in the range of from about 6 to about 8 mils per cutting edge and wherein the reamer has a rotational speed of from about 20 to about 45 sfm.

6. A reamer, which comprises:

(a) a body having a rotational axis;

(b) at least three flutes formed in the body;

(c) each flute terminating at a chamfered leading end and having a rake face and a chamfered face proximate the chamfered end;

(d) the chamfer face having a leading cutting edge and a chamfer angle of from about 10 to about 30°; and (e) each flute having a negative radial rake angle.

7. The method of claim 4 wherein step (b) comprises reducing the rate of advance to about 0.2 to about 0.5 mils per cutting edge for from about 1 to about 2 rotations of the reamer.

8. The method of claim 4 wherein the rate of advance of the chamfered end of the reamer is increased to from about 5 to about 10 mils per cutting edge after step (b).

9. The method of claim 8 wherein the length (L) of the hole is at least about 4 times the cutting diameter (D) of the reamer and wherein step (b) is carried out at least twice, the intervals between each step (b) being equal to when the chamfered end of the reamer has advanced in the hole a distance of from about 100 to about 500 mils.

10. The method of claim 9 wherein the intervals between each step (b) are equal to when the chamfered end of the reamer has advanced in the hole a distance of from about 200 to about 300 mils.

11. The reamer of claim 6 wherein the cutting edge is rounded.

12. The reamer of claim 6 wherein the chamfer angle is from about 20 to about 30°.

13. The reamer of claim 12 wherein each flute has a helix angle in the range of from 5 to about 30°.

14. The reamer of claim 13 wherein the negative radial rake angle is in the range of from −1 to about −20°.

15. The reamer of claim 14 wherein the negative radial rake angle in the range of from −5 to about −10°.

16. The reamer of claim 13 wherein each flute has a helix angle in the range of from about 8 to about 15°.

17. The reamer of claim 13 which has a cutting diameter of from about 125 to about 1000 mils.

18. The reamer of claim 17 which has a cutting diameter of from about 185 to about 750 mils.

* * * * *

UNITED STATES PATENT AND TRADEMARK OFFICE
CERTIFICATE OF CORRECTION

PATENT NO.    : 6,547,495 B2
DATED         : April 15, 2003
INVENTOR(S)   : Meece et al.

It is certified that error appears in the above-identified patent and that said Letters Patent is hereby corrected as shown below:

Column 2,
Line 51, delete "300" and insert -- 30° --.

Signed and Sealed this

Twenty-fourth Day of August, 2004

JON W. DUDAS
*Director of the United States Patent and Trademark Office*